April 9, 1963
T. J. GRIFFEN
3,084,659
INDICATOR MECHANISM
Filed June 30, 1961
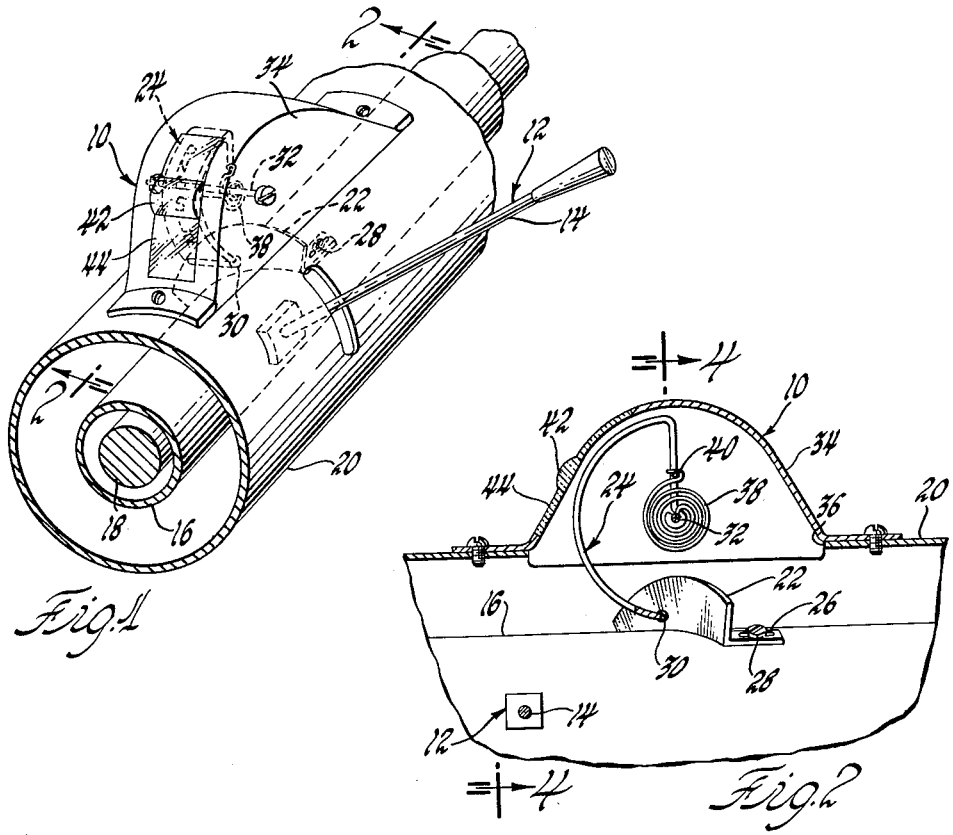
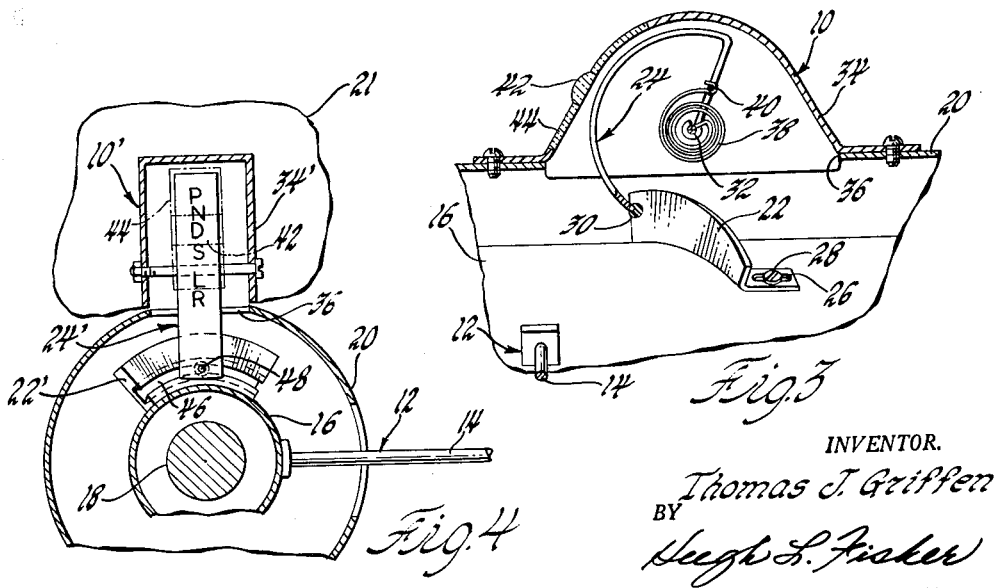
INVENTOR.
Thomas J. Griffen
BY
Hugh L. Fisher
ATTORNEY United States Patent Office 3,084,659
Patented Apr. 9, 1963

3,084,659
INDICATOR MECHANISM
Thomas J. Griffen, Dearborn, Mich., assignor to General Motors Corporation, Detroit, Mich., a corporation of Delaware
Filed June 30, 1961, Ser. No. 121,214
11 Claims. (Cl. 116—124)

This invention relates generally to indicator mechanism and particularly to indicator mechanism of the type adapted for use, although not exclusively, with vehicle transmissions.

In automatic vehicle transmissions having multiple statuses such as Park, Neutral, Reverse, Low, Drive, etc., a manually operable device is generally provided for establishing each of the statuses. Provision is also made for indicating the relationship between each setting of the device and the corresponding transmission status. Accordingly, it is important that a selected setting be accurately designated; otherwise, the transmission could be conditioned for operation in a range not intended, e.g., an uneconomical range of operation, or placed in Reverse instead of Forward Drive. Moreover, an acceptable indicator must be uncomplicated in construction, easily adjusted, suited for manufacture according to accepted mass production techniques, and not easily misaligned.

With the foregoing in mind, the invention contemplates an indicator mechanism that by the novel construction assures proper operation without requiring constant realignments; that employs a minimum number of parts; and that can be conveniently adjusted at any time particularly at installation.

More specifically, the invention seeks to provide a unique indicator mechanism that converts the motion of a control member when maneuvered to different selected settings into a setting indicating motion and thereafter causes the selected setting to be accurately and visually displayed.

The foregoing and other objects and advantages of the invention will be apparent from the following description and the accompanying drawings in which:

FIGURE 1 is a perspective view of an indicator mechanism incorporating the principles of the invention and shown combined with a vehicle transmission control;

FIGURE 2 is a sectional view of the indicator mechanism taken along the line 2—2 of FIGURE 1 and illustrates the indicator mechanism in one position thereof;

FIGURE 3 is a view similar to FIGURE 2 depicting a different setting of the indicator mechanism; and FIGURE 4 is a sectional view looking in the direction of arrows 4—4 in FIGURE 2 of a modification of the indicator mechanism.

Referring now to the drawings in detail and particularly to FIGURE 1 the numeral 10 denotes generally the indicator mechanism. The indicator mechanism 10 is used in conjunction with a transmission control denoted generally at 12 of the type that employs a manually operable shifter lever 14 to revolve a transmission shifter tube 16 and then in a known way cause the transmission (not shown) to be conditioned for different operating statuses. Positioned on the inside of the shifter tube 16 is a conventional steering shaft 18 and on the outside a steering column 20.

Although the FIGURE 1 indicator mechanism 10 is illustrated mounted on the steering column 20, it can be positioned elsewhere; e.g., on a vehicle instrument panel 21 as will be explained relative to FIGURE 4. Whatever site is chosen, the indicator mechanism 10 must be easily viewed by the operator of the vehicle.

The indicator mechanism 10 is formed in two main parts, one a cam 22 is adjustably secured to the outer periphery of the transmission shifter tube 16 and the other a follower denoted generally by the numeral 24 is operated by the cam 22. If preferred, the cam 22 can be made integral with the tube 16 so that it becomes merely a cam surface on the shifter tube 16. However, it is preferable to permit fore and aft adjustments of the cam 22 relatively to the shifter tube 16 and this is allowed by the slots 26 into which attaching screws 28 are received.

The follower 24 has at the lower end a bearing 30 that abuts against the surface of the cam 22. This bearing 30 may be of any suitable construction and is of some material that offers a minimum frictional resistance as relative movement takes place between the bearing 30 and the surface of the cam 22. The upper end of the follower 24 is joined to a cross shaft 32 supported by a housing 34 in turn mounted on the steering column 20. The follower 24 extends through an appropriate opening 36 formed in the upper side of the steering column 20.

To insure that the bearing 30 is always in engagement with the surface of the cam 22, a spring 38 of spiral configuration and having the inside end thereof joined to the cross shaft 32 and the outside end thereof joined at 40 to the follower 24 is employed. The spring 38 constantly urges the follower 24 in a counterlockwise direction as viewed in FIGURE 2.

With this construction and by having the surface of the follower 24 at the proper angle with respect to the rotational axis of the shifter tube 16, manipulation of the shifter lever 14 will revolve the transmission shifter tube 16. This rotary motion of the tube 16 is converted by the coaction between the cam 22 and the bearing 30 into corresponding rotary movement of the follower 24. The designation of the selected setting of the shifter lever 14 and accordingly the operating status of the transmission is accomplished by having legends formed on the surface of the follower 24 as shown in FIGURE 1. The depicted legends P, N, D, S, L, and R can be used to designate, respectively, Park, Neutral, Drive Range, Super Range, Low Range, and Reverse. Of course, the order of these settings and the number can be changed to comply with the requirements of a particular application. When the shifter tube 16 is positioned in a selected setting by the shifter lever 14 the legend corresponding to the chosen setting will be situated relative to an indicator carried by the housing 34. Preferably, this is achieved by mounting a lens as a prism 42 of transparent material on the housing 34 at a point where there is no distortion so as to form a window and also to provide magnification if needed. The operator can merely check the window and observe the legend in order to ascertain the transmission status.

Also, non-magnifying transparent material may be used as at 44 to extend the window so that the operator may visually and quickly determine the next available settings.

Whether the indicator mechanism 10 is to be installed or subsequently adjusted, it is only required that the transmission shifter lever 14 be placed in a setting, which could be one of the extreme end settings, such as either Park or Reverse and the transmission conditioned for the corresponding status. Then by shifting the cam 22 fore and aft on the shifter tube 16, the proper legend either P or R can be centered relative to the prism 42. Once the desired setting is established, the adjusting screws 28 can be tightened.

In the modified construction displayed in FIGURE 4, an indicator mechanism 10' has a housing 34' formed as a part of an instrument panel 21. As in the FIGURE 1 embodiment, an opening 36 is provided in the upper part of the steering column 20 through which a follower 24' extends. But in this arrangement, the spring 38 is not required since a cam 22' is provided with a retaining provision such as a groove 46 for reception of a follower end 48, which may be a ball or the like. The groove 46 may be constructed so that the bottom is wider than the outer opening somewhat in the manner of a dovetail slot so that the follower end 48 is always retained in the groove 46 during rotation of the shifter tube 16.

The operation of the modified indicator mechanism 10' is substantially the same as that described with respect to FIGURE 1. The maneuvering of the shifter tube 16 causes corresponding rotation of the follower 24' so that the legend corresponding to the selected setting can be observed through the prism 42.

As can now be appreciated, the indicator mechanisms 10 and 10' are uncomplicated in construction and certainly suitable for fabrication according to the accepted mass production techniques. A minimum number of parts are required and these are easily installed as well as subsequently adjusted if it becomes necessary. Additionally, the mechanism requires little or no effort to operate, there being only the drive connection between the cam 22 and the follower 24 with which to be concerned.

The invention is to be limited only by the following claims.

I claim:

1. An indicator mechanism for a vehicle transmission comprising a transmission control, a cam surface carried by the transmission control, a follower maneuvered by the cam surface, the follower having legends thereon corresponding to different settings of the transmission, and an indicator arranged relative to the follower so that as the transmission control is maneuvered to a desired setting the corresponding legend on the follower is aligned with the indicator.

2. An indicator mechanism for a vehicle transmission comprising a rotatable transmission control having a cam surface thereon, a pivotally mounted follower having one end thereof in engagement with the cam surface, the follower having legends thereon corresponding to different transmission settings, and an indicator arranged adjacent the legends on the follower so that as the transmission control is revolved, the selected setting is designated by the indicator.

3. An indicator mechanism for a vehicle transmission comprising a rotatable transmission control having a cam surface thereon, a follower member having legends thereon corresponding to settings of the transmission control, an indicator arranged opposite the legends, the follower having an end thereof in engagement with the cam surface, and a spring urging the one end of the follower into constant engagement with the cam surface, the follower being maneuvered by rotation of the transmission control to a selected setting so that the selected setting is designated by the alignment of the indicator with the corresponding legend.

4. An indicator mechanism for a vehicle transmission comprising a rotatable transmission control having a cam surface formed thereon, a follower revolvably mounted at one end and having the other end in engagement with the cam surface, the follower having legends thereon corresponding to each of the settings of the transmission control so that as the transmission control is revolved to a certain setting the corresponding legend is denoted by the indicator.

5. An indicator mechanism for a vehicle transmission comprising a rotatable transmission control having a cam surface thereon, a fixed member adjacent the cam surface, an arcuate follower having one end pivotally joined to the fixed member and the other end in engagement with the cam surface, and a spring for urging the one end into constant engagement with the cam surface, an indicator carried by the fixed member and positioned adjacent the follower, the follower having legends thereon corresponding to each of the settings of the transmission control so that as the rotatable transmission control is revolved to a certain setting the corresponding legend is aligned with the indicator.

6. An indicator mechanism for a vehicle transmission comprising a rotatable transmission control having a cam surface thereon, the cam surface including a retaining portion, a fixed member, a follower having one end pivotally slidably retained in the fixed member and the other end joined to the retaining portion of the cam surface, an indicator situated on the fixed member adjacent the follower, the follower having a series of legends corresponding to each setting of the transmission control, the transmission control when revolved to a certain setting causing the corresponding legend on the follower to be aligned with the indicator.

7. An indicator mechanism for a vehicle transmission comprising a movable transmission control having a cam surface, a follower having a series of legends thereon corresponding to different settings of the transmission, an indicator lens arranged opposite the legends, the follower engaging the cam surface and adapted to be maneuvered thereby when the transmission control is moved to a selected setting so that the corresponding legend is aligned with the indicator lens.

8. An indicator mechanism for a vehicle transmission comprising a rotatable transmission control having a sloped cam surface, a fixed member adjacent the sloped cam surface, a follower member pivotally mounted on the fixed member and having one end thereof in engagement with the sloped cam surface, an indicator on one of said members, legends corresponding to different transmission settings on the other of said members, the indicator being located adjacent the legend and cooperating therewith so that as the transmission control is revolved to different settings of the transmission, the selected setting is designated by the indicator.

9. An indicator mechanism as set forth in claim 8 wherein the follower member is arcuate in shape and has one end pivotally mounted on the fixed member and the other end in engagement with the sloped cam surface, a spiral spring urging the one end into constant engagement with the sloped cam surface, the indicator carried by the fixed member, the follower having the legends thereon corresponding to different transmission settings, and the indicator including an indicator lens arranged opposite the legends so that when the transmission control is moved to a selected setting the corresponding legend is aligned with the indicator lens.

10. An indicator mechanism for a vehicle transmission comprising a rotatable transmission control having a sloped cam surface, a fixed member adjacent the sloped cam surface, a follower member pivotally mounted on the fixed member and having one end thereof in engagement with the sloped cam surface, a spring for urging the end of the follower member into constant engagement with the sloped cam surface, an indicator on one of said members, legends corresponding to different transmission settings on the other of said members, the indicator being located adjacent the legends and cooperating therewith so that as the transmission control is revolved to different setting of the transmission, the selected setting is designated by the indicator.

11. An indicator mechanism for a vehicle transmission comprising a rotatable transmission control having a sloped cam surface, the sloped cam surface including a retaining portion, a fixed member adjacent the sloped cam surface, a follower member pivotally mounted on the fixed member and having one end thereof slidably retained in the retaining portion of the sloped cam surface, an indicator on one of said members, legends corresponding to different transmission settings on the other of said members, the indicator being located adjacent the legends and cooperating therewith so that as the transmission control is revolved to different settings of the transmission, the selected setting is designated by the indicator.

References Cited in the file of this patent

UNITED STATES PATENTS

| | | |
|---|---|---|
| 2,303,049 | Ingalls | Nov. 24, 1942 |
| 2,756,717 | Reid et al. | July 31, 1956 |